United States Patent Office

3,720,837
Patented Mar. 13, 1973

3,720,837
MEASURING AND INDICATING APPARATUS
Anton Hubert Clemens and Richard La Verne Hurtle, Elkhart, Ind., assignors to Miles Laboratories, Inc., Elkhart, Ind.
Filed Dec. 20, 1971, Ser. No. 210,068
Int. Cl. H01j 39/12
U.S. Cl. 250—206                                    10 Claims

ABSTRACT OF THE DISCLOSURE

Apparatus circuitry for measuring and providing an indication of a sensed characteristic, such as reflected light, is described. It comprises in combination a sensor, a voltage controlled oscillator functioning as an analog-to-digital convertor, scalers to provide certain count values, a computation unit connected to such scalers to provide an output count which is directly related to a function of the sensed characteristic being measured, and a decoder scaler and indicator capable of converting the computation unit output to a suitable signal so as to provide an indication, such as a printed symbol, of the sensed characteristic.

BACKGROUND AND PRIOR ART

It is known that various types of measuring circuits and analog or digital readout apparatus have been employed for sensing various characteristics, such as light reflectance. Most of the prior art apparatus have certain inherent disadvantages. The analog approach usually does not have the stability required for precise measurements, whereas direct digital conversion requires highly complex and expensive apparatus. This is particularly true when automated instrumentation is desired. There is thus a need for a relatively simple but precise apparatus for measuring and indicating desired characteristics.

SUMMARY OF THE INVENTION

In accordance with the present invention, apparatus is provided to measure and provide an indication of a sensed characteristic, which apparatus comprises in combination a sensor having a voltage output corresponding to a function of the sensed characteristic, a voltage controlled oscillator having a frequency output dependent upon an input voltage, a gated count scaler, a gated time base scaler, a clock pulse generator, a computation unit, a gated decoder scaler and a gated indicator. The sensor, voltage controlled oscillator, gated count scaler, gated time base scaler and clock pulse generator are connected so that a reference voltage output of the sensor causes the frequency counts from the output of the voltage controlled oscillator to be accumulated in the gated count scaler until a predetermined number of reference counts are achieved, whereupon the gated count scaler ceases accumulating further counts and is reset to zero. During this same time interval counts from the clock pulse generator are also being accumulated in the gated time base scaler, which, at the end of such interval ceases accumulating further counts from the clock pulse generator and stores the accumulated counts. The subsequent application of a measuring voltage from the sensor to the voltage controlled oscillator causes the gated count scaler to again begin accumulating measuring counts from the voltage controlled oscillator and the gated time base scaler simultaneously to begin deducting counts from those stored therein until the stored counts reach zero, whereupon the gated count scaler ceases to further accumulate measuring counts. The gated count scaler, the computation unit, the gated decoder scaler, the gated indicator and the clock pulse generator are connected so that the accumulated measuring counts are supplied from the gated count scaler to the computation unit to provide output counts from the computation unit which are directly related to a function of the sensed characteristic being measured, said output counts being fed to the gated decoder scaler which also receives counts from the clock pulse generator. The gated decoder scaler is capable of counting down from the value of the computation unit output counts until such count-down value reaches a predetermined indication value, whereupon the gated decoder scaler receives no further counts from the clock pulse generator, and the gated indicator is activated.

DESCRIPTION OF THE INVENTION

Figure 1:
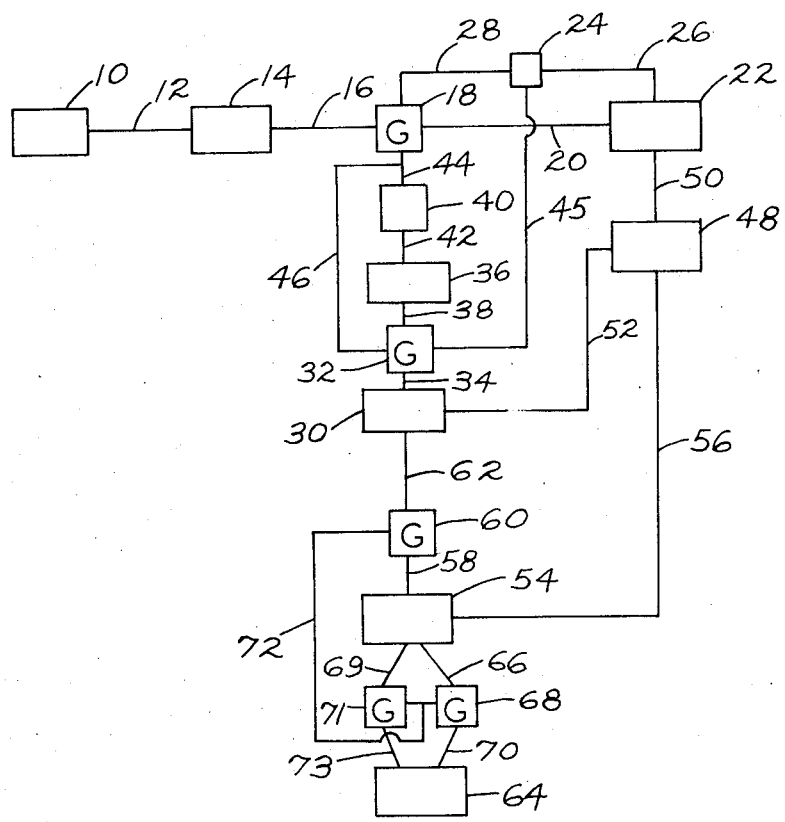
FIG. 1 is a schematic block diagram of the electronic circuitry of apparatus of the present invention.

Referring to FIG. 1, sensor 10, which may, for example, be a light sensitive device, is connected through line 12 to a voltage controlled oscillator 14 which is, in turn, connected to a gate 18 through line 16. Gate 18 is connected to a gated count scaler 22 through line 20. A flip-flop multivibrator 24 is connected to scaler 22 through line 26 and to gate 18 through line 28. A clock pulse generator 30 is connected to a gate 32 through line 34, and gate 32 is connected to a gated time base scaler 36 through line 38. A flip-flop multivibrator 40 is connected to scaler 36 through line 42 and to gate 18 through line 44. Gate 18 is connected to gate 32 through line 44 and 46. Multivibrator 24 is connected to gate 32 through line 45.

A computation unit 48 is connected to scaler 22 through line 50 and to clock pulse generator 30 through line 62. A gated decoder scaler 54 is connected to computation unit 48 through line 56 and to clock pulse generator 30 through line 58, a gate 60 and line 62. Scaler 54 is connected to a gated indicator 64 through line 66, a gate 68 and line 70 as well as through line 69, a gate 71 and line 73. Gates 68 and 71 are each connected to each other and to gate 60 by line 72. The specific internal circuitry of the various components shown in blocks in FIG. 1 is not critical and is well-known to those skilled in the art.

Sensor 10 can generate a voltage signal which is directly dependent upon a function of the characteristic being sensed. For example, if reflected light from an object is being sensed, sensor 10 is a light sensitive device, and the voltage signal generated by sensor 10 is directly related to such reflected light. Voltage controlled oscillator 14 generates a variable frequency output which is directly dependent upon the voltage input received by it from sensor 10 and thus is directly dependent upon the sensed characteristic. The frequency output from oscillator 14 enables gate 18 to allow pulses from oscillator 14 into gated count scaler 22 where they are accumulated and counted. Voltage controlled oscillator 14 thus functions as an analog-to-digital convertor.

When gate 18 is enabled, it also enables gate 32 which allows pulses from clock pulse generator 30 into gated time base scaler 36 where they are accumulated and counted concurrently with the pulses being counted in scaler 22.

Pulses are counted in scaler 22 until a predetermined number, such as 4096, is reached. When this pulse count is achieved, multivibrator 24 is activated, whereupon it disables gate 18 stopping the input of further pulses from oscillator 14 to scaler 22. This also disables gate 32 and stops the input of further pulses from generator 30 to scaler 36. Scaler 22 is then reset to zero, while scaler 36 retains the accumulated counts stored therein.

This filling of scaler 22 is achieved with a reference voltage generated by sensor 10. In the case of reflected light, this reference voltage is achieved by exposing sensor 10 to the light source or to the light transmitted by a reference filter. This procedure is then generally repeated with a measuring voltage generated by sensor 10. In the case of reflected light, this measuring voltage is achieved by exposing sensor 10 to the specific light to be measured or to the light transmitted by a measuring filter.

The measuring voltage from sensor 10, being generally of a different value and less than that of the previous reference voltage, causes a different and lower frequency signal to be generated by oscillator 14. This output frequency enables gate 18 and starts scaler 22 to counting pulses from oscillator 14. This also enables gate 32 to allow pulses from clock pulse generator 30 to enter scaler 36. In this mode, however, the pulses entering scaler 36 are subtracted from the previously stored counts. The pulses from generator 30 are allowed to enter scaler 36 until the stored value therein reaches zero, at which time multivibrator 40 is activated to disable gates 18 and 32. This stops additional pulses from entering scalers 22 and 36.

The resulting number of measuring counts in scaler 22, accumulated over the same time period as the initial number of counts, when compared to the initial predetermined number of counts, represents the ratio of the sensed characteristics, such as light reflectance, under the reference and measuring conditions. Since the initial predetermined number of counts is always constant, one need deal only with the second count value.

The above-obtained second count value (measuring counts) in scaler 22 is transferred to computation unit 48 along with clock pulses from generator 30. Computation unit 48 performs the necessary mathematical procedures employing preset functional relationships to provide output counts along line 56 which are directly related to a function of the sensed characteristic being measured. For example, if the pH of a liquid system is being measured by detecting the light reflected from a pH-sensitive reaction zone through a measuring filter, the specific output pulses from computation unit 48 will be directly related to the pH of the liquid system.

Gate 60 is normally enabled allowing clock pulses from generator 30 to enter gated decoder scaler 54. Such pulses are employed to count-down from the count value transferred to scaler 54 from computation unit 48.

Gate 68 connected to gated indicator 64 is adjusted to become enabled at a predetermined count value representative of a specific indication to be shown or activated by indicator 64. For example, if the indicator 64 is to be activated at a pH above 8, gate 68 could be preset to be enabled at a count value of 206. If the count value from computation unit 48 is equal to or greater than 206, because the system being measured has a pH equal to or greater than 8, when the count-down value in scaler 54 reaches 206, gate 68 will be enabled activating indicator 64 to produce the desired indication. This also disables gate 60 and stops further count-down of scaler 54. If the count value from computation unit 48 is less than 206, because the system being measured has a pH less than 8, gate 68 will not become enabled and indicator 64 will not be activated to indicate a pH above 8. When the count-down value reaches zero or to some other predetermined value, gate 71 will become enabled and indicator 64 will be activated to indicate a pH value below 8.

Figure 2:
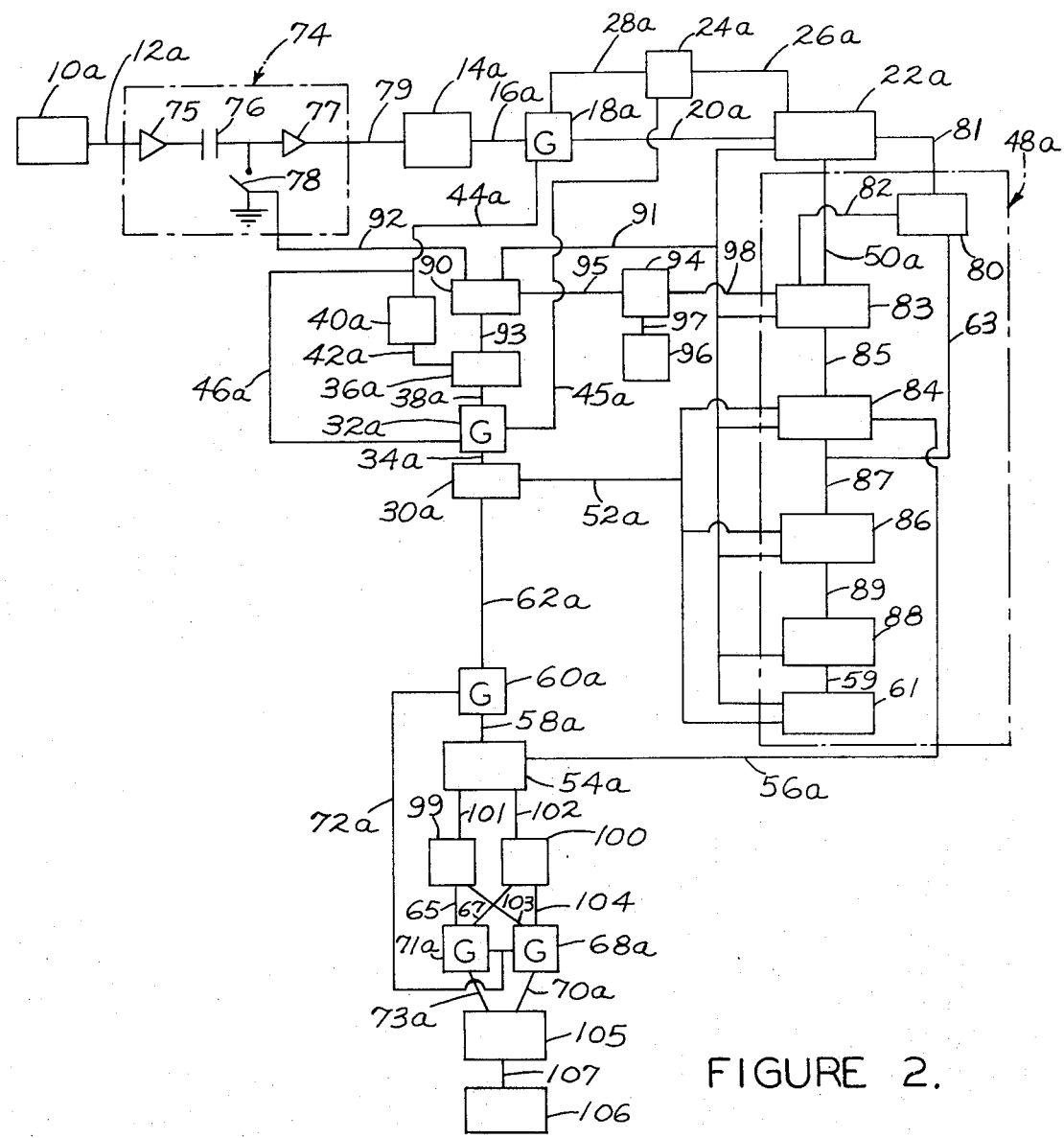
FIG. 2 is a schematic block diagram of the electronic circuitry of a preferred form of apparatus of the present invention.

Referring to FIG. 2, the apparatus of the present invention is shown in more detail in a preferred form. Items corresponding to the same items of FIG. 1 have the same reference numbers with the suffix "a." Sensor 10a is connected through line 12a to a background compensator circuit 74. This compensator circuit includes an amplifier 75, a capacitor 76, a high-impedance amplifier 77, and a switch 78 connected to ground as shown. The compensator circuit 74 is connected to a voltage controlled oscillator 14a through line 79.

A computation unit 48a comprises a count scaler memory 80 connected to an external scaler 22a through line 81, an arithmetic unit 83 connected to the scaler 22a through line 50a and to memory 80 through line 82, an accumulator 84 connected to an arithmetic unit 83 through line 85, a quotient scaler 86 connected to accumulator 84 through line 52a. Accumulator 84 is also connected to a quotient scaler 86 through line 89, and a comparator and multiplier register 61 connected to memory 88 through line 59. The accumulator 84, quotient scaler 86 and comparator 61 are connected to a clock pulse generator 30a through line 52a. Accumulator 84 is also connected to a scaler 54a through line 56a. Memory 80 is connected to line 87 through line 63.

A programmer unit 90 is connected to scaler 22a, arithmetic unit 83, accumulator 84, quotient scaler 86, multiplier memory 88 and comparator 61 through line 91. Programmer unit 90 is also connected to switch 78 of compensator circuit 74 through line 92. Programmer unit 90 is further connected to scaler 36a through line 93 and to a switch 94 through line 95. A normalizing signal source 96 is connected to switch 94 through line 97, and switch 94 is connected to arithmetic unit 83 through line 98.

Scaler 54a is connected to a pair of binary-to-line convertors 99 and 100 through lines 101 and 102 respectively. While two binary-to-line convertors are shown, it is understood that a single convertor can be used so long as it has the necessary count capacity. These binary-to-line convertors are also connected to a gate 68a through lines 103 and 104 respectively and to a gate 71a through lines 65 and 67 respectively. Gates 68a and 71a are connected through lines 70a and 73a respectively to a gated print wheel shift register 105 which is, in turn, connected to a print wheel 106 through line 107.

In the operation of the circuit shown in FIG. 2, the sensor 10a, voltage controlled oscillator 14a, gate 18a, scaler 22a, multivibrator 24a, clock pulse generator 30a, gate 32a, scaler 36a, multivibrator 40a, computation unit 48a, scaler 54a, gates 60a, 68a and 71a operate in the same manner as described above for the circuit of FIG. 1.

A sensor 10a, such as a light sensitive device, providing a voltage output generally has a background voltage which is generated even if the sensor 10a is not sensing any characteristic. This background voltage is not important if the normal voltage produced by the sensor 10a in sensing is quite large. However, this background voltage could produce significant measuring errors if the sensing voltage is relatively low. This potential source of error is eliminated in the present invention by means of the compensator circuit 74. Prior to use of the sensor 10a for measurement, it is isolated from any source of sensing characteristic. In the case of a light sensitive sensor, it is cut off from any light source. Switch 78 is closed by a signal from programer 90, and capacitor 76 thus becomes charged with a voltage representing the background voltage of sensor 10a. Switch 78 is then opened by an appropriate signal from programer 90. Sensor 10a is then exposed to a source of sensing characteristic. The resulting voltage applied to voltage controlled oscillator 14a is the total voltage generated by sensor 10a minus the background voltage stored in capacitor 76, and thus it is an accurate representation of the actual voltage caused by the sensed characteristic. Capacitor 76 has decay characteristics such that it can hold the background voltage during the subsequent reading so as to properly compensate the voltage.

The operation of the components of computation unit 48a will now be described. Specific counts obtained by scaler 22a can be stored in scaler memory 80 for subsequent use by the arithmetic unit 83 or other components of computation unit 48a. Unit 83 performs arithmetical functions, such as addition and subtraction, but it does not store the result of such operation. The accumulator 84 stores such result for further use. If a quotient is desired, the dividend is supplied to unit 83 and the divisor is subtracted therefrom in unit 83. The remainder from accumulator 84 is supplied to unit 83 and the divisor is again subtracted therefrom. This procedure is repeated until the remainder in the accumulator 84 is reduced to zero. The number of times this subtraction is repeated is the quotient, and the resulting quotient value is counted in scaler 86. If such quotient or other value is to be subsequently used as a multiplier, it is stored in memory 88.

Arithmetic unit 83 can perform mutiplication through a series of additions in the following manner. The multiplier is supplied to unit 83 from memory 88 and the multiplicand from memory 80 or accumulator 84. The multiplicand is added to zero from the accumulator, and the resulting sum in accumulator 84 is again added to the multiplicand from memory 80 in unit 83. These additions are repeated the number of times equal to the units of the multiplier in memory 88. This is controlled by comparator 61. Each time the above addition is performed, a unit is counted in the comparator 61. When the total value of counts in comparator 61 reaches the value stored in memory 88, unit 83 stops further additions, and the resulting product is stored in accumulator 84. Clock pulses from generator 30a synchronize the above operations.

As an illustration of this computation operation, if a second reading by sensor 10a is to be subtracted from a first reading, the first reading from scaler 22a is stored in memory 88. The second reading from scaler 22a along with the stored information from memory 80 then enters unit 83 and the necessary subtraction is performed. The difference is stored in accumulator 84. If this difference is then to be divided into another value, such as a normalizing signal obtained from source 96, switch 94 is opened to allow the normalizing value to enter unit 83 through line 98. The stored value in accumulator 84 also enters unit 83. The resulting quotient obtained as described above is then counted in scaler 86 and stored in memory 88. Subsequent readings by sensor 10a enter unit 83 and are multiplied by the factor in memory 88 which is also fed to unit 83 as described above, and the end result appears in accumulator 84. All these operations take place in response to commands from programer 90.

The output counts from accumulator 84 then pass to decoder scaler 54a. The pulses from scaler 54a pass into the binary-to-line convertors 99 and 100. These convertors can be, for example, binary-to-sixteen line packages. Convertor 99 can have individual line outputs representing from 0 to 15 pulses, while convertor 100 can have individual line outputs representing 15 to 240 pulses. These pulses represent, for example, the result of the output from an eight-bit down counter scaler 54a decoded to the base sixteen in convertors 99 and 100. The pulse outputs from convertors 99 and 100 are fed to gates 68a and 71a which are preset to be enabled by specific pulse values from the convertors. If the convertor output is sufficient to enable gate 68a, a print wheel shift register 105 is activated to further activate print wheel 106 and print an appropriate symbol on a suitable object. Similar action takes place if the output is sufficient to enable gate 71a. It is understood that indicator means other than a print wheel can also be employed, such as lights, bells, digital indicators and the like.

Figure 3:
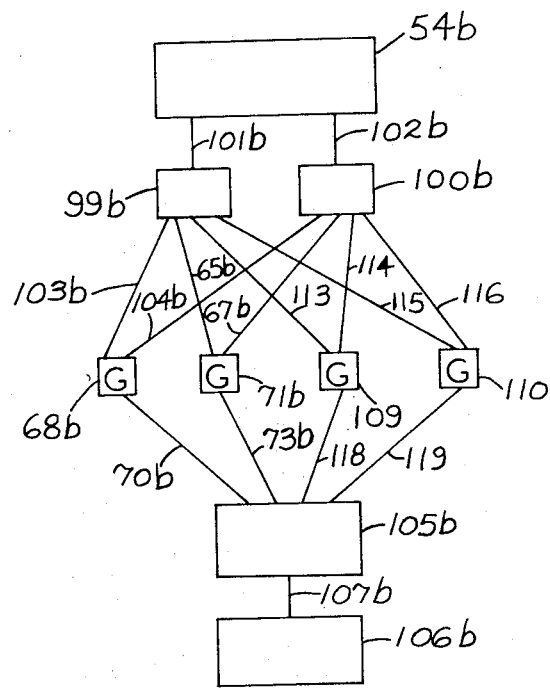
FIG. 3 is a schematic block diagram of a portion of the electronic circuitry of the preferred form of apparatus of the present invention.

Referring to FIG. 3, the items corresponding to preceding items in FIGS. 1 and/or 2 will have the same number but with a suffix "b." The outputs from convertors 99b and 100b are fed to a gate 68b through lines 103b and 104b. Three additional gates shown as 71b, 109 and 110 are also connected to convertors 99b and 100b through lines 65b, 67b, 113, 114, 115 and 116 respectively. The outputs of gates 68b, 71b, 109 and 110 are connect to a shift register 105b through lines 70b, 73b, 118 and 119 respectively. Gates 68b, 71b, 109 and 110 are preset to be enabled by different pulse values. For example, assume that gate 68b is enabled at less than 18 pulses, gate 71b at 18 pulses, gate 109 at 78 pulses and gate 110 at 134 pulses. Further, assume that less than 18 pulses represent a "0" characteristic being sensed, 18 pulses represent "+1," 78 pulses represent "+2" and 134 pulses represent "+3." If the pulses entering the scaler 54b are equal to or greater than 134, the entering pulses will be counted down until the value of 134 is reached. This will enable gate 110 which will stop further count-down pulses and will activate shift register 105b. The signal from gate 110 will cause register 105b to activate print wheel 106b to print "+3." If the pulses entering scaler 54b are less than 134 but more than 78, the entering pulses will be counted down until the value of 78 is reached which will enable gate 109. This will cause print wheel 106b to print "+2." If the pulses entering scaler 54b are less than 78 but more than 18, the entering pulses will be counted down until the value of 18 is reached which will enable gate 71b causing print wheel 106b to print "+1." If the pulses entering scaler 54b are less than 18, the entering pulses will be counted down until the value of 0 or some preset value less than 18 is reached which will enable gate 68b causing print wheel 106b to print "0."

It is understood that the above enabling pulse values for the separate gates are merely illustrative and than any desired values can be employed. Also, more or less than four gates can be employed.

The apparatus of the present invention is especially useful in the measurement of various components in a liquid system, such as glucose, occult blood, ketones, protein, bilirubin and pH of urine. The overall apparatus can have a plurality of separate circuits, one for each component being measured. Some components, such as print wheel, clock pulse generator and the like, could be common to more than one circuit, and the overall sequence of operations will be controlled by a programer.

The use of the above apparatus to measure a single characteristic, such as ketones in urine, will be described in the following explanation with reference to FIGS. 2 and 3. A specific chromogenic reaction system impregnated in a bibulous carrier (not shown) and which provides a range of color values depending upon the ketone concentration is employed. Such reaction systems are known in the art. If a light source (not shown) is directed at the reaction system which has previously been exposed to a liquid sample, the amount of light being reflected therefrom will be dependent upon the color of the reaction system which, in turn, is dependent upon the amount of ketones in the sample. When light sensitive devices, such as sensor 10a, are employed to measure differences in concentration by differences in total reflected light rather than in spectral differences, it is desirable to control the wavelength of the reflected light being sensed to a range having the greatest differences in the total reflectance with changes in concentration. For this purpose, a filter (not shown) having a desired range of wavelength transmission is placed between the reflected light object (not shown) and the sensor. When differences in concentration are to be measured by differences in total reflected light, it is also desirable to measure a reference reflectance at a wavelength where all concentrations of the measured characteristic have substantially the same overall reflectance. For this purpose a reference measurement is made using a filter (not shown) having the range of wavelength transmission at the above latter value. For some light reflectance measurements, light directly from the light source or reflected from a white surface can be used without a filter for the reference measurement.

In the use of the apparatus of the present invention for light reflectance measurements, the reference reading, with or without a filter, is done first and is employed to fill scaler 22a. The measurement reading using an appropriate filter is done second, and the resulting scaler value, being less than the scaler capacity, is transferred to the computation unit 48a for further use. It is understood that before each reference or measurement reading, the background compensator circuit 74 is activated.

In order to calibrate the apparatus, two liquid samples are employed. A "negative" sample (not shown) consisting of a standard urine with no ketones, for example, and a "high" sample (not shown) consisting of a standard urine with the highest anticipated amount of ketones, for example, are used. A ketone test system (not shown) is contacted with the "negative" sample and reference and measuring reading are taken resulting in a pulse count from scaler 22a stored in memory 80. A fresh portion of ketone test system is contacted with the "high" sample and reference and measuring readings are taken resulting in a pulse count from scaler 22a which is transferred to arithmetic unit 83 along with the pulse count stored in memory 80.

With the specific test system being employed, a "high" sample will cause a darker color to be produced having a lower reflectance. The lower reflectance will generate a lower voltage in sensor 10a and a lower frequency output from oscillator 14a resulting in a lower pulse count in scaler 22a as compared to that of the "negative" sample.

The programer 90 signals unit 83 to subtract the second pulse count for scaler 22a from the first pulse count stored in memory 80. Even though this "negative" pulse count is used in this specific computation, its value is still stored in memory 80 for further use. The resulting difference, representing the total pulse count span from low to high ketone values, is then stored in accumulator 84. Since this pulse count difference is usually not within the useful range of the scalers employed for operating the indicating devices, this pulse count difference must be "normalized" by reducing it to the range of such scalers. This is accomplished by introducing a normalizing pulse count from source 96 to unit 83 by activating switch 94 from programer 90 and dividing this normalizing value by the above pulse count difference stored in accumulator 84. The resulting quotient or "k" factor is counted in scaler 86 and stored in memory 88. The above calibration procedure is carried out in order to obtain the "negative" pulse count stored in memory 80 and the "k" factor stored in memory 88.

The apparatus is then used to measure the unknown ketone content of a specific sample (not shown). A ketone test reagent system is contacted with a portion of the sample, a light source is directed at the test system, and the voltage compensation, reference and measuring readings are taken as described above. The resulting net measuring pulse count from scaler 22a is fed to unit 83. Programer 90 signals unit 83 to subtract this sample reading from the "negative" reading stored in memory 80 and then to multiply this difference by "k" stored in memory 88. The resulting pulse count value stored in accumulator 84 represents a point between the normalized pulse count values for a "negative" and a "high" sample and is thus directly related to the concentration of ketones in the sample. This output pulse count is then transferred to decoder scaler 54b having four gates as shown in FIG. 3. The operation of the gates to activate the print wheel to pring "0", "+1", "+2", or "+3" is described above in detail with respect to FIG. 3.

If an apparatus of the present invention is employed to measure a plurality of variables, the measuring circuits for each variable must be separately calibrated as described above in order to supply the appropriate memory units with the corresponding "negative" and "k" factor values.

While the above description is directed primarily at apparatus using a light sensitive device as the sensor to measure reflected light from reagent test systems, it is understood that the apparatus of the present invention is not so limited and can be used to sense other characteristics, such as temperature, magnetic fields, radioactivity and the like. The only requirement is that the sensor generate a voltage during its sensing operations.

What is claimed is:

1. Apparatus for measuring and providing an indication of a sensed characteristic which comprises, in combination, a sensor having a voltage output corresponding to a function of the sensed characteristic, a voltage controlled oscillator having a frequency output dependent upon an input voltage, a gated count scaler, a gated time base scaler, a clock pulse generator, a computation unit, a gated decoder scaler and a gated indicator; said sensor, said voltage controlled oscillator, said gated count scaler, said gated time base scaler and said clock pulse generator being connected so that a reference voltage output of the sensor causes the frequency counts from the output of the voltage controlled oscillator to be accumulated in the gated count scaler until a predetermined number of reference counts are achieved, and so that during this same time interval counts from the clock pulse generator are also accumulated in the gated time base scaler, the accumulation in said gated count scaler of said predetermined number of reference counts being effective to reset the latter to zero and to terminate accumulation of further counts in the gated time base scaler which retains the counts stored therein, the subsequent application of a measuring voltage from the sensor to the voltage controlled oscillator causing the gated count scaler to again accumulate measuring counts from the voltage controlled oscillator and the gated time base scaler to deduct counts received from the clock pulse generator from the stored counts therein until the stored counts reach zero, at which time further accumulation of measuring counts in the gated count scaler is terminated; said gated count scaler, said computation unit, said gated decoder scaler, said gated indicator and said clock pulse generator being connected so that measuring counts are supplied from the gated count scaler to the computation unit to provide output counts from the computation unit which are directly related to a function of the sensed characteristic being measured, said output counts being fed to the gated decoder scaler which also receives counts from the clock pulse generator, said gated decoder scaler being capable of counting down from the value of the computation unit output counts until such count-down value reaches a predetermined indication value, whereupon the gated decoder scaler receives no further counts from the clock pulse generator, and the gated indicator is activated.

2. Apparatus according to claim 1 also having means for compensating for background voltage generated by the sensor.

3. Apparatus according to claim 1 wherein the computation unit comprises, in combination, a count scaler memory, an arithmetic unit, an accumulator, a quotient scaler, a multiplier memory, and a comparator.

4. Apparatus according to claim 1 wherein said gated decoder scaler is connected to at least one binary-to-line convertor, and the output of said convertor is connected to the gated indicator.

5. Apparatus according to claim 1 wherein said gated indicator prints the desired indications and comprises a gated print wheel shift register and a print wheel.

6. Apparatus according to claim 1 wherein the gated indicator contains a plurality of separate gates connected to the output of the decoder scaler, each of said gates representing a separate predetermined indication value.

7. Apparatus for the measurement and indication of a plurality of separate characteristics comprising a plurality of apparatus combinations according to claim 1, each separate characteristic having a separate apparatus combination, said apparatus having an overall programer unit to control the desired sequence of operations employing such apparatus.

8. Apparatus according to claim 1 wherein the sensor is a light sensitive device and the sensed characteristic is the light reflected from an object.

9. Apparatus according to claim 8 wherein the reference voltage and the measuring voltage produced by the sensor are obtained at different light wavelengths.

10. Apparatus for measuring and providing an indication of a sensed characteristic which comprises, in combination, (1) a sensor having a voltage output corresponding to a function of the sensed characteristic, (2) means for compensating for background voltage generated by the sensor, (3) a voltage controlled oscillator having a frequency output dependent upon an input voltage, (4) a gated count scaler, (5) a gated time base scaler, (6) a clock pulse generator, (7) a computation unit comprising, in combination, a count scaler memory, an arithmetic unit, an accumulator, a quotient scaler, a multiplier memory and a comparator, (8) a gated decoder scaler connected to at least one binary-to-line convertor, and (9) a gated indicator containing a plurality of separate gates each representing a separate predetermined indication value; said sensor, said voltage controlled oscillator, said gated count scaler, said gated time base scaler and said clock pulse generator being connected so that a reference voltage output of the sensor causes the frequency counts from the output of the voltage controlled oscillator to be accumulated in the gated count scaler until a predetermined number of reference counts are achieved, and so that during this same time interval counts from the clock pulse generator are also accumulated in the gated time base scaler, the accumulation in said gated count scaler of said predetermined number of reference counts being effective to reset the latter to zero and to terminate accumulation of further counts in the gated time base scaler which retains the counts stored therein, the subsequent application of a measuring voltage from the sensor to the voltage controlled oscillator causing the gated count scaler to again accumulate measuring counts from the voltage controlled oscillator and the gated time base scaler to deduct counts received from the clock pulse generator from the stored counts therein until the stored counts reach zero, at which time further accumulation of measuring counts in the gated count scaler is terminated; said gated count scaler, said computation unit, said gated decoder scaler and binary-to-line convertor, said gated indicator and said clock pulse generator being connected so that the measuring counts are supplied from the gated count scaler to the computation unit to provide output counts from the computation unit which are directly related to a function of the sensed characteristic being measured, said output counts being fed to the gated decoder scaler which also receives counts from the clock pulse generator, said gated decoder scaler being capable of counting down from the value of the computation unit output counts until such count-down value output of the binary-to-line convertor reaches a predetermined indication value of a gate connected to the gated indicator, whereupon the gated decoder scaler receives no further counts from the clock pulse generator, and the gated indicator is activated.

References Cited

UNITED STATES PATENTS

| | | | |
|---|---|---|---|
| 3,678,269 | 7/1972 | Malek | 250—218 |
| 3,528,749 | 9/1970 | Bowker | 250—214 |
| 3,531,209 | 9/1970 | Williamson | 250—214 |
| 3,663,110 | 5/1972 | Rising | 250—206 |

JAMES W. LAWRENCE, Primary Examiner

D. C. NELMS, Assistant Examiner

U.S. Cl. X.R.

250—214